(12) United States Patent
Sharma et al.

(10) Patent No.: US 7,648,951 B2
(45) Date of Patent: *Jan. 19, 2010

(54) DISHWASHING METHOD

(75) Inventors: Sanjeev Sharma, Newcastle upon Tyne (GB); James Iain Kinloch, Northumberland (GB); Simon John Greener, Tyne & Wear (GB); Kenton Ray Lynde, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/981,040

(22) Filed: Oct. 31, 2007

(65) Prior Publication Data

US 2008/0076693 A1 Mar. 27, 2008

Related U.S. Application Data

(60) Continuation of application No. 11/302,843, filed on Dec. 14, 2005, now Pat. No. 7,521,411, which is a division of application No. 09/994,557, filed on Nov. 27, 2001, now abandoned.

(30) Foreign Application Priority Data

Nov. 27, 2000 (GB) ................ 0028823.3
Nov. 14, 2001 (GB) ................ 0127277.2

(51) Int. Cl.
*C11D 17/06* (2006.01)
*C11D 17/08* (2006.01)
*C11D 3/395* (2006.01)

(52) U.S. Cl. .............. 510/293; 510/220; 510/221; 510/224; 510/296; 510/297

(58) Field of Classification Search ............ 383/38; 510/293, 220, 221, 224, 296, 297, 373, 513, 510/514; 134/25.1, 25.2, 25.3, 25.4, 6, 7; 264/248

See application file for complete search history.

(56) References Cited

U.S. PATENT DOCUMENTS

| | | | |
|---|---|---|---|
| 3,208,192 A | 9/1965 | Schaefer | |
| 3,218,776 A | 11/1965 | Cloud | |
| 3,469,768 A | * 9/1969 | Repko | .......... 383/207 |
| 3,502,487 A | 3/1970 | Byrd | |
| 3,528,921 A | 9/1970 | Gray | |
| 3,705,102 A | 12/1972 | Mast | |
| D234,751 S | 4/1975 | Brodsky | |
| 4,115,292 A | 9/1978 | Richardson et al. | |
| 4,154,636 A | 5/1979 | Motoyama et al. | |
| 4,162,987 A | 7/1979 | Maguire, Jr. et al. | |
| 4,176,079 A | 11/1979 | Guerry et al. | |
| 4,416,791 A | 11/1983 | Haq | |
| 4,622,161 A | 11/1986 | Cornelissens et al. | |
| 4,747,976 A | 5/1988 | Yang et al. | |
| 4,776,455 A | 10/1988 | Anderson et al. | |
| 4,818,427 A | 4/1989 | Altenschoepfer et al. | |
| 4,828,744 A | 5/1989 | Kaufmann et al. | |
| 4,885,105 A | 12/1989 | Yang et al. | |
| 4,929,380 A | 5/1990 | Schulz et al. | |
| 4,973,416 A | 11/1990 | Kenedy | |
| 5,015,513 A | 5/1991 | Newbold et al. | |
| 5,110,641 A | 5/1992 | Kean | |
| 5,132,036 A | 7/1992 | Falou et al. | |
| 5,141,664 A | 8/1992 | Corring et al. | |
| 5,146,730 A | 9/1992 | Sadek et al. | |
| 5,160,654 A | 11/1992 | Falou et al. | |
| 5,224,601 A | 7/1993 | Gouge et al. | |
| 5,248,038 A | 9/1993 | Hodakowski et al. | |
| 5,272,191 A | 12/1993 | Ibrahim et al. | |
| D343,573 S | 1/1994 | Shadrach et al. | |
| 5,280,835 A | 1/1994 | Edwards et al. | |
| 5,328,025 A | 7/1994 | Hodakowski et al. | |
| 5,330,047 A | 7/1994 | Gouge et al. | |
| 5,336,430 A | 8/1994 | Bahary et al. | |
| 5,351,831 A | 10/1994 | Gouge et al. | |
| 5,362,532 A | 11/1994 | Famill et al. | |
| 5,384,364 A | 1/1995 | Besse et al. | |
| 5,394,990 A | 3/1995 | Edwards et al. | |
| 5,395,616 A | 3/1995 | Edwards et al. | |
| 5,395,617 A | 3/1995 | Edwards et al. | |
| 5,403,589 A | 4/1995 | Edwards et al. | |
| 5,407,680 A | 4/1995 | Edwards et al. | |
| 5,419,909 A | 5/1995 | Edwards et al. | |
| 5,422,113 A | 6/1995 | Edwards et al. | |
| RE34,988 E | 7/1995 | Yang et al. | |
| 5,429,242 A | 7/1995 | Edwards et al. | |
| 5,429,874 A | 7/1995 | VanPutte | |
| 5,464,097 A | 11/1995 | Edwards et al. | |
| 5,516,562 A | 5/1996 | Edwards et al. | |
| 5,540,989 A | 7/1996 | Maul et al. | |
| 5,624,034 A | 4/1997 | Edwards et al. | |
| 5,806,285 A | 9/1998 | Rizzieri | |
| 5,827,586 A | 10/1998 | Yamashita et al. | |
| 5,830,543 A | 11/1998 | Miyake et al. | |
| 5,863,885 A | 1/1999 | Ruggieri et al. | |

(Continued)

FOREIGN PATENT DOCUMENTS

CA 1112534 11/1981

(Continued)

*Primary Examiner*—Joseph L Perrin
(74) *Attorney, Agent, or Firm*—Idris N. McKelvey; Laura R. Grunzinger

(57) ABSTRACT

A pouch, and a process for making thereof, comprising the steps of: pre-sealing a compartment comprising a pouch material, the compartment containing an anhydrous composition to form a pre-sealed compartment; fitting a first piece of the pouch material into a mould; pouring a particulate dishwashing product into the mould; placing the pre-sealed compartment over the mould; sealing the pre-sealed compartment and said first piece of pouch material together to form the multi-compartment pouch.

1 Claim, No Drawings

U.S. PATENT DOCUMENTS

| | | |
|---|---|---|
| 5,914,368 A | 6/1999 | Haschke et al. |
| 5,929,007 A | 7/1999 | Feng |
| 6,037,319 A | 3/2000 | Dickler et al. |
| 6,089,374 A | 7/2000 | Edwards et al. |
| 6,090,771 A | 7/2000 | Burt et al. |
| 6,124,036 A | 9/2000 | Brown et al. |
| 6,133,214 A | 10/2000 | Jung et al. |
| 6,136,776 A | 10/2000 | Dickler et al. |
| 6,193,058 B1 | 2/2001 | Yacko et al. |
| 6,228,825 B1 | 5/2001 | Gorlin et al. |
| 6,244,746 B1 | 6/2001 | Tokita et al. |
| D445,673 S | 7/2001 | Richardson |
| D445,675 S | 7/2001 | Richardson |
| 6,281,183 B1 | 8/2001 | Harbour |
| 6,303,553 B1 | 10/2001 | Gorlin |
| D451,795 S | 12/2001 | Ghatlia et al. |
| D452,143 S | 12/2001 | Ghatlia et al. |
| 6,363,693 B1 | 4/2002 | Edwards et al. |
| 6,378,274 B1 | 4/2002 | Harbour |
| 6,451,750 B2 | 9/2002 | Hewitt et al. |
| 6,465,408 B1 | 10/2002 | Lee et al. |
| 6,465,413 B1 | 10/2002 | Hinton |
| 6,475,975 B1 | 11/2002 | Kinscherf et al. |
| 6,475,977 B1 | 11/2002 | Pfeiffer et al. |
| 6,479,448 B2 | 11/2002 | Cropper et al. |
| 6,479,449 B1 | 11/2002 | Mondin |
| 6,482,785 B1 | 11/2002 | Mondin |
| 6,486,109 B1 | 11/2002 | Mondin |
| 6,486,116 B1 | 11/2002 | Hinton |
| 6,492,312 B1 | 12/2002 | Pfeiffer et al. |
| 6,495,503 B1 | 12/2002 | Zappone et al. |
| 6,495,504 B1 | 12/2002 | Schramm, Jr. et al. |
| 6,495,505 B1 | 12/2002 | Reul et al. |
| 2001/0026792 A1 | 10/2001 | Farrell et al. |
| 2001/0031714 A1 | 10/2001 | Gassenmeier et al. |
| 2001/0053754 A1 | 12/2001 | Hewitt et al. |
| 2002/0004472 A1 | 1/2002 | Holderbaum et al. |
| 2002/0004473 A1 | 1/2002 | Busch et al. |
| 2002/0013232 A1 | 1/2002 | Kinoshita et al. |
| 2002/0013242 A1 | 1/2002 | Baillely et al. |
| 2002/0013243 A1 | 1/2002 | Hewitt et al. |
| 2002/0026771 A1 | 3/2002 | Brown |
| 2002/0028756 A1 | 3/2002 | Carter et al. |
| 2002/0033004 A1 | 3/2002 | Edwards et al. |
| 2002/0045559 A1 | 4/2002 | Forth et al. |
| 2002/0055449 A1 | 5/2002 | Porta et al. |
| 2002/0086806 A1 | 7/2002 | Giblin et al. |
| 2002/0094942 A1 | 7/2002 | Danneels et al. |
| 2002/0115583 A1 | 8/2002 | Lant et al. |
| 2002/0119903 A1 | 8/2002 | Lant et al. |
| 2002/0123443 A1 | 9/2002 | Bennie et al. |
| 2002/0123444 A1 | 9/2002 | Fisher et al. |
| 2002/0137648 A1 | 9/2002 | Sharma et al. |
| 2002/0142930 A1 | 10/2002 | Smith et al. |
| 2002/0142931 A1 | 10/2002 | DeNome et al. |
| 2002/0166779 A1 | 11/2002 | Etesse et al. |
| 2002/0169092 A1 | 11/2002 | Catlin et al. |
| 2002/0169095 A1 | 11/2002 | Forth et al. |
| 2002/0198125 A1 | 12/2002 | Jones |
| 2006/0097424 A1 | 5/2006 | Sharma et al. |

FOREIGN PATENT DOCUMENTS

| | | |
|---|---|---|
| EP | 0 132 726 A2 | 2/1985 |
| EP | 0 261 754 A2 | 3/1988 |
| EP | 0 261 754 B1 | 9/1991 |
| EP | 0846 757 A2 | 6/1996 |
| EP | 0 608 910 B1 | 6/1997 |
| EP | 0 879 874 A2 | 11/1998 |
| EP | 0 879 874 A3 | 6/1999 |
| EP | 1 126 070 A1 | 8/2001 |
| EP | 0889 710 B1 | 2/2002 |
| GB | 2 330 362 A2 | 4/1999 |
| GB | 2 361 687 A | 10/2001 |
| JP | 46-12306 | 2/1973 |
| JP | 62 235400 | 10/1987 |
| JP | 09-071800 | 3/1997 |
| WO | WO 92/17382 A1 | 10/1992 |
| WO | WO 94/14941 A1 | 7/1994 |
| WO | WO 96/24328 A1 | 8/1996 |
| WO | WO 97/35537 * | 10/1997 |
| WO | WO 97/35537 A1 | 10/1997 |
| WO | WO 98/30670 A2 | 7/1998 |
| WO | WO 99/24548 | 5/1999 |
| WO | WO 9924549 | 5/1999 |
| WO | WO 00/02980 A2 | 1/2000 |
| WO | WO 00/02980 A3 | 1/2000 |
| WO | WO 00/55068 A1 | 9/2000 |
| WO | WO 01/79417 A1 | 10/2001 |
| WO | WO 01/83657 A2 | 11/2001 |
| WO | WO 02/08371 A2 | 1/2002 |
| WO | WO 02/08376 | 1/2002 |
| WO | WO 02/14460 A2 | 2/2002 |
| WO | WO 02/16205 A1 | 2/2002 |
| WO | WO 02/16206 A1 | 2/2002 |
| WO | WO 02/16207 A1 | 2/2002 |
| WO | WO 02/16222 A1 | 2/2002 |
| WO | WO 02/16541 A1 | 2/2002 |
| WO | WO 02/060757 A2 | 8/2002 |
| WO | WO 02/060758 A1 | 8/2002 |
| WO | WO 02/074891 A2 | 9/2002 |
| WO | WO 02/074891 A3 | 9/2002 |
| WO | WO 02/074892 A1 | 9/2002 |
| WO | WO 02/085707 A1 | 10/2002 |
| WO | WO 02/085736 A1 | 10/2002 |
| WO | WO 02/085737 A1 | 10/2002 |
| WO | WO 02/085738 A1 | 10/2002 |

* cited by examiner

DISHWASHING METHOD

CROSS REFERENCE TO RELATED APPLICATION

This application is a continuation of U.S. Divisional application Ser. No. 11/302,843, filed Dec. 14, 2005.

TECHNICAL FIELD

The present invention is in the field of dishwashing, in particular it relates to dishwashing methods including methods for washing dishware/tableware in an automatic dishwashing machine using dishwashing products in multi-compartment pouch form. The methods of the invention provide excellent cleaning results.

BACKGROUND OF THE INVENTION

Unitised doses of dishwashing detergents are found to be more attractive and convenient to some consumers because they avoid the need of the consumer to measure the product thereby giving rise to a more precise dosing and avoiding wasteful overdosing or underdosing. For this reason automatic dishwashing detergent products in tablet form have become very popular. Detergent products in pouch form are also known in the art.

It is well known to use bleach in dishwashing detergent formulations in order to remove stains, especially tea, coffee, fruit juice and carotenoid stains. Chlorine and peroxygen bleaches are effective for stain removal. While chlorine bleach is a very effective cleaning agent, it is not compatible with a variety of detergent ingredients and may require additional processing in order to be incorporated into a final product. Peroxide bleaches on the other hand are more compatible with conventional detergent ingredients. However, one of the problems found when formulating peroxygen containing dishwashing detergent compositions is the fact that the bleach is liable to decompose in contact with moisture, thereby reducing the amount of active bleach available for the dishwashing process. Once the decomposition process is initiated, moreover, decomposition is auto catalysed by the presence of free radicals generated by the decomposition process. The products of bleach decomposition can also oxidise detergency enzymes, thereby reducing the amount of enzyme available for the dishwashing process.

In the case of flexible unitised doses such as pouches, capsules or sachets which are moisture permeable, bleach decomposition gives rise to an additional problem due to the generation of gaseous oxygen. Usually the pouch material is not permeable to oxygen and this can lead to bloating or even destruction of the pouch and to a detrimental effect on appearance and on dispenser fit.

Some detergent ingredients used in dishwashing detergent compositions are liquids. These liquid ingredients can be difficult or costly to include in a solid detergent composition. Also, certain ingredients are preferably transported and supplied to detergent manufacturers in a liquid form and require additional, and sometimes costly, process steps to enable them to be included in a solid detergent composition. An example of these detergent ingredients are surfactants, especially nonionic surfactants which are typically liquid at room temperature or are typically transported and supplied to detergent manufacturers in liquid form. Another example are organic solvents.

Current methods of incorporating liquid ingredients into solid detergent compositions include absorbing the liquid ingredient onto a solid carrier, for example by mixing, agglomeration or spray-on techniques. Typically, solid detergent compositions comprise only low amounts of these liquid detergent ingredients due to the difficulty and expense of incorporating these liquid ingredients into a solid detergent. The problems are particularly acute in the case of solid compositions which are subject to a densification step and especially to the levels of densification applied in machine dishwashing tablet manufacture. Furthermore, the incorporation of liquid ingredients into solid detergent compositions can impact on the dissolution characteristics of the composition (for example as the result of forming surfactant gel phases) and can also lead to problems of flowability. It would be advantageous to have a detergent composition which allows the different ingredients to be in their natural state i.e., liquid or solid. This would facilitate the manufacturing process and furthermore allow the delivery of liquid ingredients prior or post to the delivery of solid ingredients. For example differential dissolution of active ingredients would be beneficial in the case of enzyme/bleach compositions to avoid oxidation of enzymes by the bleach in the dishwashing liquor. It would also be advantageous to separate bleach from perfume.

An objective of the present invention is to provide dishwashing methods and products delivering improved cleaning performance and product stability. Another object is to provide dishwashing methods and products which have simplified processing, which allow for the problems of product incompatibility and which are capable of providing differential dissolution of active components.

SUMMARY OF THE INVENTION

According to a first aspect of the present invention, there is provided a method of washing dishware/tableware in an automatic dishwashing machine, the method comprising simultaneously or sequentially delivering quantities of a particulate or densified particulate automatic dishwashing product and of an anhydrous liquid, gel or paste form dishwashing detergent auxiliary contained in separate compartments of a multi-compartment pouch into the same or different cycles of the dishwashing machine.

Suitable multi-compartment pouches (which term includes capsules, sachets and other compartmentalized unit dose containers) for use herein include water-soluble, water-dispersible and water-permeable pouches. Preferred for use herein are water soluble pouches, based on partially hydrolysed polyvinylacetate/polyvinyl alcohol as pouch material. Although, soluble in water, these pouches have the disadvantage that they are permeable to moisture.

The term anhydrous as used herein is intended to include compositions containing less than about 10% of water by weight of the composition, preferably less than about 5% of water and more preferably less than about 1%. The water can be present in the form of hydrated compounds, i.e. bound water or in the form of moisture. It is preferred that the composition contains less than about 1%, preferably less than about 0.1% free moisture. Free moisture can be measured by extracting 2 g of the product into 50 ml of dry methanol at room temperature for 20 minutes and then analysis a 1 ml aliquot of the methanol by Karl Fischer titration. The term water-soluble as used to describe the pouch means that the pouch or a compartment thereof dissolves or disperses in water to release some or all of the contents thereof at some temperature or range of temperatures in the normal operating range of a dishwashing machine (ambient to 70° C.). Under other temperatures or conditions of use, however, the pouch or compartment thereof may be insoluble in water, remaining intact for extended periods greater than that of the normal operating regime of the dishwashing machine.

In a preferred embodiment the particulate dishwashing product is densified. Densification can be achieved by compaction, compression, tamping, tapping, stamping, vibrating, subjecting to inertial forces, etc, densification being preferably such as to provide a bulk density increase of at least about 10%, preferably at least about 20%, more preferably at least about 30%. The final bulk density is preferably at least about 0.6 g/cc, more preferably at least about 0.8 g/cc, especially at least about 1 g/cc, and more especially at least about 1.3 g/cc.

In a preferred embodiment, the densified particulate dishwashing product is in the form of a tablet. Multi-compartment pouches comprising a tablet and an anhydrous liquid, gel or paste present the known advantages of tablets, such as high product density, minimum storage volume requirements and efficient packing, but they also allow for the simultaneous or sequential release of a liquid, gel or paste in quantities which it would be impossible to achieve through normal tabletting techniques. A further advantage of said pouches is that the user does not touch or come into direct contact with the tablet and the remainder of the automatic dishwashing composition.

From the manufacturing viewpoint, multi-compartment pouches comprising a particulate automatic dishwashing product in the form of a tablet are very convenient because the filling of pouches with particulate product can be complex and prone to inaccuracies. It is often slow and likely to produce dust, such that it can be very difficult to avoid dust deposition on the pouch seal area. This can be detrimental to achieving a strong seal.

The tablet can be formed using any suitable method, but preferably by compression, for example in a tablet press. Preferably, the tablet is a compressed shaped body prepared by mixing together the components of the automatic dishwashing detergent followed by applying a compression pressure of at least about 40 kg/cm$^2$, preferably at least about 250 kg/cm$^2$, more preferably at least about 350 kg/cm$^2$ (3.43 kN/cm$^2$), even more preferably from about 400 to about 2000, and especially from about 600 to about 1200 kg/cm$^2$ (compression pressure herein is the applied force divided by the cross-sectional area of the tablet in a plane transverse to the applied force—in effect, the transverse cross-sectional area of the die of the rotary press). Such tablets being preferred herein from the viewpoint of providing optimum tablet integrity and strength (measured for example by the Child Bite Strength [CBS] test) and product dissolution characteristics. The tablets preferably have a CBS of at least about 6 kg, preferably greater than about 8 kg, more preferably greater than about 10 kg, especially greater than about 12 kg, and more especially greater than about 14 kg, CBS being measured per the US Consumer Product Safety Commission Test Specification.

The tablet can take a variety of geometric shapes such as spheres, cubes, etc but preferably has a generally axially-symmetric form with a generally round, square or rectangular cross-section.

The tablet can be prepared such that it comprises at least one mould in its surface. The mould or moulds can also vary in size and shape and in their location, orientation and topology relative to the tablet. For example, the mould or moulds can be generally circular, square or oval in cross-section; they can form an internally-closed cavity, depression or recess in the surface of the tablet, or they can extend between unconnected regions of the tablet surface (for example axially-opposed facing surfaces) to form one or more topological 'holes' in the tablet; and they can be axially or otherwise symmetrically-disposed relative to the tablet or they can be asymmetrically disposed. Preferably, the mould is preformed, for example being created using a specially designed tablet press wherein the surface of the punch that contacts the detergent composition is shaped such that when it contacts and presses the detergent composition it presses a mould, or multiple moulds into the detergent tablet. Preferably, the mould will have an inwardly concave or generally concave surface to provide improved housing and physical storage of the liquid, gel or paste containing compartment. Alternatively, the mould can be created by compressing a preformed body of detergent composition disposed annularly around a central dye, thereby forming a shaped body having a mould in the form of a cavity extending axially between opposing surfaces of the body. Tablets with moulds are very useful from the viewpoint of accommodating the compartment comprising the anhydrous liquid, gel or paste dishwashing detergent auxiliary of the present invention.

According to a preferred embodiment of the present invention, the particulate dishwashing product comprises one or more moisture-sensitive detergent actives and the detergent auxiliary comprises a humectant in levels sufficient to act as a moisture sink for stabilising the moisture-sensitive detergent active. A detergent active is considered to be moisture-sensitive when it can interact with moisture to decrease its detergency activity as for example detergency bleach. Particulate bleaches suitable for use herein include inorganic peroxides inclusive of perborates and percarbonates, organic peracids inclusive of preformed monoperoxy carboxylic acids, such as phthaloyl amido peroxy hexanoic acid and di-acyl peroxides. Preferred peroxides for use herein are percarbonate and perborate bleach.

Humectant is a substance which can pick up or emit moisture to the surroundings depending on the surrounding relative humidity. When formulated as part of the detergent auxiliary, the humectants used herein are capable of acting as moisture sink for the powder layer. This stabilises the moisture-sensitive detergent active. The humectants should have a humidity equilibrium point such as to enable them to act as moisture sink but preferably they should take up less than about 10%, more preferably less than about 5% even more preferably less than about 1% of water at a relative humidity of 50% or less, preferably at relative humidity of 75% or less, and more preferably at relative humidity of 90% or less under ambient conditions of temperature and pressure (20° C. and 1 atmosphere). Humectants suitable for use herein include non-aqueous hydrophilic organic solvents inclusive of glycols and polyhydric alcohols, for example sorbitol, glycerol, dipropylene glycol and mixtures thereof, and also various hygroscopic solids inclusive of inorganic or organic salts such as silicates, phosphates and citrates, as well as sugars, etc. Preferred for use herein are humectants and humectant mixtures comprising glycols, more preferably polyethylene glycols and especially mixtures of polyethylene glycols of different molecular weight. For example, mixtures of polyethylene glycol having a molecular weight of about 200 to about 1,200, more preferably from about 200 to about 800 and polyethylene glycol having a molecular weight of about 2,000 to about 6,000 more preferably from about 2,600 to about 4,000. In the mixtures of polyethylene glycol used herein the low molecular weight and the high molecular weight polyethylene glycol are usually in a weight ratio of at least 10:1 and preferably at least 100:1.

In a preferred embodiment, the anhydrous detergent auxiliary composition comprises a detergency enzyme. The enzyme is preferably in liquid form and is delivered to the wash liquor substantially prior to the particulate products, thereby minimizing or avoiding interaction with actives, such as bleach, which can have a deleterious effect on enzyme stability and performance in the wash solution.

In preferred embodiments the dishwashing composition comprises an organic solvent system. The organic solvent system can simply act as a liquid carrier, but in preferred compositions, the solvent can aid removal of cooked-, baked- or burnt-on soil and thus has detergent functionality in its own right. The organic solvent system (comprising a single solvent compound or a mixture of solvent compounds) preferably has a volatile organic content above 1 mm Hg and more preferably above 0.1 mm Hg of less than about 50%, preferably less than about 20% and more preferably less than about 10% by weight of the solvent system. Herein volatile organic content of the solvent system is defined as the content of organic components in the solvent system having a vapor pressure higher than the prescribed limit at 25° C. and atmospheric pressure.

The organic solvent system for use herein is preferably selected from organoamine solvents, inclusive of alkanolamines, alkylamines, alkyleneamines and mixtures thereof; alcoholic solvents inclusive of aromatic, aliphatic (preferably $C_4$-$C_{10}$) and cycloaliphatic alcohols and mixtures thereof; glycols and glycol derivatives inclusive of $C_2$-$C_3$ (poly)alkylene glycols, glycol ethers, glycol esters and mixtures thereof; and mixtures selected from organoamine solvents, alcoholic solvents, glycols and glycol derivatives. In one preferred embodiment the organic solvent comprises organoamine (especially alkanolamine) solvent and glycol ether solvent, preferably in a weight ratio of from about 3:1 to about 1:3, and wherein the glycol ether solvent is selected from ethylene glycol monobutyl ether, diethylene glycol monobutyl ether, ethylene glycol monomethyl ether, ethylene glycol monoethyl ether, diethylene glycol monomethyl ether, diethylene glycol monoethyl ether, propylene glycol monobutyl ether, and mixtures thereof. Preferably, the glycol ether is a mixture of diethylene glycol monobutyl ether and propylene glycol butyl ether, especially in a weight ratio of from about 1:2 to about 2:1.

According to another embodiment of the invention the dishwashing auxiliary composition can take the form of a paste having a density greater than about 1100 Kg/m$^3$, preferably greater than about 1300 Kg/m$^3$.

Multi-compartment pouches suitable for use herein can include compartments with different solubility profiles controlled by for example pH, temperature or any other means. High temperature water-soluble pouches allow handling of the pouches at ambient temperature with wet hands.

The multi-compartment pouches herein comprise at least one compartment containing a powder or densified powder composition and at least one containing an anhydrous liquid, gel or paste. This powder composition comprises traditional solid materials used in dishwashing detergent, such as builders, alkalinity sources, together with moisture-sensitive detergent active such as bleaches, etc. The liquid, gel or paste compositions comprise traditional liquid materials used in dishwashing detergents, such as non-ionic surfactants or the organic solvents described hereinabove together with a humectant. Preferably the compartment comprising the detergent auxiliary is placed above or adjacent the compartment comprising the moisture-sensitive detergent active in order to help protect the moisture-sensitive detergent active and to reduce the surface area of the pouch containing compartment which is exposed to moisture.

DETAILED DESCRIPTION OF THE INVENTION

The present invention envisages the use of dishwashing detergent and auxiliary compositions in a multi-compartment pouch, whereby a moisture-sensitive detergent active and a humectant are contained in separate compartments. The humectant is capable of acting as a moisture sink and acts to stabilize the moisture-sensitive detergent active.

Unitised dose forms specially useful for use herein are pouches. The pouch herein is typically a closed structure which comprises two or more compartments, made of materials described herein. Subject to the constraints of dispenser fit, the pouch can be of any form, shape and material which is suitable to hold the composition, e.g. without allowing the release of the composition from the pouch prior to contact of the pouch to water. The exact execution will depend on, for example, the type and amount of the composition in the pouch, the number of compartments in the pouch, the characteristics required from the pouch to hold, protect and deliver or release the composition and/or components thereof.

The composition, or components thereof, are contained in the internal volume space of the pouch, and are typically separated from the outside environment by a barrier of water-soluble material. Typically, different components of the composition contained in different compartments of the pouch are separated from one another by a barrier of water-soluble material.

In the case of multi-compartment pouches, the compartments may be of a different colour from each other, for example a first compartment may be green or blue, and a second compartment may be white or yellow. One compartment of the pouch may be opaque or semi-opaque, and a second compartment of the pouch may be translucent, transparent, or semi-transparent. The compartments of the pouch may be the same size, having the same internal volume, or may be different sizes having different internal volumes.

For reasons of deformability and dispenser fit under compression forces, pouches or pouch compartments containing a component which is liquid will usually contain an air bubble having a volume of up to about 50%, preferably up to about 40%, more preferably up to about 30%, more preferably up to about 20%, more preferably up to about 10% of the volume space of said compartment.

The pouch is preferably made of a pouch material which is soluble or dispersible in water, and preferably has a water-solubility of at least 50%, preferably at least 75% or even at least 95%, as measured by the method set out hereafter using a glass-filter with a maximum pore size of 20 microns.

50 grams±0.1 gram of pouch material is added in a pre-weighed 400 ml beaker and 245 ml±1 ml of distilled water at the appropriate temperature is added. This is stirred vigorously on a heatable plate with a magnetic stirrer set at 600 rpm, for 30 minutes. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the % solubility or dispersability at the specified temperature can be calculated.

Preferred pouch materials are polymeric materials, preferably polymers which are formed into a film or sheet. The pouch material can, for example, be obtained by casting, blow-moulding, extrusion or blow extrusion of the polymeric material, as known in the art.

Preferred polymers, copolymers or derivatives thereof suitable for use as pouch material are selected from polyvinyl alcohols, partially hydrolysed polyvinylacetates, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, hydroxybutyl methylcellulose, maltodextrin, polymethacrylates, and most preferably selected from polyvinyl alcohols, polyvinyl alcohol copolymers, partially hydrolysed polyvinylacetates and hydroxypropyl methyl cellulose (HPMC), hydroxybutyl methylcellulose (HBMC), and combinations thereof. Preferably, the level of polymer in the pouch material, for example a PVA polymer, is at least 60%.

The polymer can have any weight average molecular weight, preferably from about 1000 to 1,000,000, more preferably from about 10,000 to 300,000 yet more preferably from about 20,000 to 150,000.

Mixtures of polymers can also be used as the pouch material. This can be beneficial to control the mechanical and/or dissolution properties of the compartments or pouch, depending on the application thereof and the required needs. Suitable mixtures include for example mixtures wherein one polymer has a higher water-solubility than another polymer, and/or one polymer has a higher mechanical strength than another polymer. Also suitable are mixtures of polymers having different weight average molecular weights, for example a mixture of PVA or a copolymer thereof of a weight average molecular weight of about 10,000-40,000, preferably around 20,000, and of PVA or copolymer thereof, with a weight average molecular weight of about 100,000 to 300,000, preferably around 150,000.

Also suitable herein are polymer blend compositions, for example comprising hydrolytically degradable and water-soluble polymer blends such as polylactide and polyvinyl alcohol, obtained by mixing polylactide and polyvinyl alcohol, typically comprising about 1-35% by weight polylactide and about 65% to 99% by weight polyvinyl alcohol.

Preferred for use herein are polymers inclusive of polyvinylacetate which are from about 60% to about 98% hydrolysed, preferably about 80% to about 90% hydrolysed, to improve the dissolution characteristics of the material.

Most preferred pouch materials are PVA films known under the trade reference Monosol M8630, as sold by Chris-Craft Industrial Products of Gary, Ind., US, and PVA films of corresponding solubility and deformability characteristics. Other films suitable for use herein include films known under the trade reference PT film or the K-series of films supplied by Aicello, or VF-HP film supplied by Kuraray.

The pouch material herein can also comprise one or more additive ingredients. For example, it can be beneficial to add plasticisers, for example glycerol, ethylene glycol, diethyleneglycol, propylene glycol, sorbitol and mixtures thereof. Other additives include functional detergent additives to be delivered to the wash water, for example organic polymeric dispersants, etc.

The pouch can be prepared according to methods known in the art. The pouch is typically prepared by first cutting an appropriately sized piece of pouch material, preferably the pouch material. The pouch material is then folded to form the necessary number and size of compartments and the edges are sealed using any suitable technology, for example heat sealing, wet sealing or pressure sealing. Preferably, a sealing source is brought into contact with the pouch material, heat or pressure is applied and the pouch material is sealed.

The pouch material is typically introduced to a mould and a vacuum applied so that the pouch material is flush with the inner surface of the mould, thus forming a vacuum formed indent or niche in said pouch material. This is referred to as vacuum-forming.

Another suitable method is thermo-forming. Thermo-forming typically involves the step of forming an open pouch in a mould under application of heat, which allows the pouch material to take on the shape of the mould.

Typically more than one piece of pouch material is used for making multi-compartment pouches. For example, a first piece of pouch material can be vacuum pulled into the mould so that said pouch material is flush with the inner walls of the mould. A second piece of pouch material can then be positioned such that it at least partially overlaps, and preferably completely overlaps, with the first piece of pouch material. The first piece of pouch material and second piece of pouch material are sealed together. The first piece of pouch material and second piece of pouch material can be made of the same type of material or can be different types of material.

In a preferred process, a piece of pouch material is folded at least twice, or at least three pieces of pouch material are used, or at least two pieces of pouch material are used wherein at least one piece of pouch material is folded at least once. The third piece of pouch material, or a folded piece of pouch material, creates a barrier layer that, when the sachet is sealed, divides the internal volume of said sachet into at least two or more compartments.

The pouch can also be prepared by fitting a first piece of the pouch material into a mould, for example the first piece of film may be vacuum pulled into the mould so that said film is flush with the inner walls of the mould. A composition, or component thereof, is typically poured into the mould. A pre-sealed compartment made of pouch material, is then typically placed over the mould containing the composition, or component thereof. The pre-sealed compartment preferably contains a composition, or component thereof. The pre-sealed compartment and said first piece of pouch material may be sealed together to form the pouch.

The detergent auxiliary herein can comprise traditional detergency components and can also comprise organic solvents having a cleaning function and organic solvents having a carrier or diluent function or some other specialised function. The compositions will generally be built and comprise one or more detergent active components which may be selected from colorants, bleaching agents, surfactants, alkalinity sources, enzymes, thickeners (in the case of liquid, paste, cream or gel compositions), anti-corrosion agents (e.g. sodium silicate) and disrupting and binding agents (in the case of powder, granules or tablets). Highly preferred detergent auxiliary components include a builder compound, an alkalinity source, a surfactant, an enzyme and a bleaching agent.

Unless otherwise specified, the components described hereinbelow can be incorporated either in the automatic dishwashing product or detergent auxiliary.

The organic solvents should be selected so as to be compatible with the tableware/cookware as well as with the different parts of an automatic dishwashing machine. Furthermore, the solvent system should be effective and safe to use having a volatile organic content above 1 mm Hg (and preferably above 0.1 mm Hg) of less than about 50%, preferably less than about 30%, more preferably less than about 10% by weight of the solvent system. Also they should have very mild pleasant odours. The individual organic solvents used herein generally have a boiling point above about 150° C., flash point above about 100° C. and vapor pressure below about 1 mm Hg, preferably below 0.1 mm Hg at 25° C. and atmospheric pressure.

Solvents that can be used herein include: i) alcohols, such as benzyl alcohol, 1,4-cyclohexanedimethanol, 2-ethyl-1-hexanol, furfuryl alcohol, 1,2-hexanediol and other similar materials; ii) amines, such as alkanolamines (e.g. primary alkanolamines: monoethanolamine, monoisopropanolamine, diethylethanolamine, ethyl diethanolamine; secondary alkanolamines: diethanolamine, diisopropanolamine, 2-(methylamino)ethanol; ternary alkanolamines: triethanolamine, triisopropanolamine); alkylamines (e.g. primary alkylamines: monomethylamine, monoethylamine, monopropylamine, monobutylamine, monopentylamine, cyclohexylamine), secondary alkylamines: (dimethylamine), alkylene amines (primary alkylene amines: ethylenediamine, propylenediamine) and other similar materials; iii) esters, such as ethyl lactate, methyl ester, ethyl acetoacetate, ethylene glycol monobutyl ether acetate, diethylene glycol monoethyl ether acetate, diethylene glycol monobutyl ether acetate and other similar materials; iv) glycol ethers, such as ethylene glycol monobutyl ether, diethylene glycol monobutyl ether, ethylene glycol monomethyl ether, ethylene glycol monoethyl ether, diethylene glycol monomethyl ether, diethylene glycol monoethyl ether, propylene glycol butyl ether and other similar materials; v) glycols, such as propylene glycol, diethylene glycol, hexylene glycol (2-methyl-2, 4 pentanediol), triethylene glycol, composition and dipropylene glycol and other similar materials; and mixtures thereof.

Surfactant

In the methods of the present invention, the detergent surfactant is preferably low foaming by itself or in combination with other components (i.e. suds suppressers). Surfactants suitable herein include anionic surfactants such as alkyl sulfates, alkyl ether sulfates, alkyl benzene sulfonates, alkyl glyceryl sulfonates, alkyl and alkenyl sulphonates, alkyl ethoxy carboxylates, N-acyl sarcosinates, N-acyl taurates and alkyl succinates and sulfosuccinates, wherein the alkyl, alkenyl or acyl moiety is $C_5$-$C_{20}$, preferably $C_{10}$-$C_{18}$ linear or branched; cationic surfactants such as chlorine esters (U.S. Pat. Nos. 4,228,042, 4,239,660 and 4,260,529) and mono $C_6$-$C_{16}$ N-alkyl or alkenyl ammonium surfactants wherein the remaining N positions are substituted by methyl, hydroxyethyl or hydroxypropyl groups; low and high cloud point nonionic surfactants and mixtures thereof including nonionic alkoxylated surfactants (especially ethoxylates derived from $C_6$-$C_{18}$ primary alcohols), ethoxylated-propoxylated alcohols (e.g., Olin Corporation's Poly-Tergent® SLF18), epoxy-capped poly(oxyalkylated) alcohols (e.g., Olin Corporation's Poly-Tergent® SLF18B—see WO-A-94/22800), ether-capped poly(oxyalkylated) alcohol surfactants, and block polyoxyethylene-polyoxypropylene polymeric compounds such as PLURONIC®, REVERSED PLURONIC®, and TETRONIC® by the BASF-Wyandotte Corp., Wyandotte, Mich.; amphoteric surfactants such as the $C_{12}$-$C_{20}$ alkyl amine oxides (preferred amine oxides for use herein include lauryldimethyl amine oxide and hexadecyl dimethyl amine oxide), and alkyl amphocarboxylic surfactants such as Miranol™ C2M; and zwitterionic surfactants such as the betaines and sultaines; and mixtures thereof. Surfactants suitable herein are disclosed, for example, in U.S. Pat. Nos. 3,929,678, 4,259,217, EP-A-0414 549, WO-A-93/08876 and WO-A-93/08874. Surfactants are typically present at a level of from about 0.2% to about 30% by weight, more preferably from about 0.5% to about 10% by weight, most preferably from about 1% to about 5% by weight of composition. Preferred surfactant for use herein are low foaming and include low cloud point nonionic surfactants and mixtures of higher foaming surfactants with low cloud point nonionic surfactants which act as suds suppresser therefor.

Builder

Builders suitable for use in detergent and cleaning compositions herein include water-soluble builders such as citrates, carbonates and polyphosphates e.g. sodium tripolyphosphate and sodium tripolyphosphate hexahydrate, potassium tripolyphosphate and mixed sodium and potassium tripolyphosphate salts; and partially water-soluble or insoluble builders such as crystalline layered silicates (EP-A-0164514 and EP-A-0293640) and aluminosilicates inclusive of Zeolites A, B, P, X, HS and MAP. The builder is typically present at a level of from about 1% to about 80% by weight, preferably from about 10% to about 70% by weight, most preferably from about 20% to about 60% by weight of composition.

Amorphous sodium silicates having an $SiO_2$:$Na_2O$ ratio of from 1.8 to 3.0, preferably from 1.8 to 2.4, most preferably 2.0 can also be used herein although highly preferred from the viewpoint of long term storage stability are compositions containing less than about 22%, preferably less than about 15% total (amorphous and crystalline) silicate.

Enzyme

Enzymes suitable herein include bacterial and fungal cellulases such as Carezyme and Celluzyme (Novo Nordisk A/S); peroxidases; lipases such as Amano-P (Amano Pharmaceutical Co.), M1 Lipase® and Lipomax® (Gist-Brocades) and Lipolase® and Lipolase Ultra® (Novo); cutinases; proteases such as Esperase®, Alcalase®, Durazym® and Savinase® (Novo) and Maxatase®, Maxacal®, Properase® and Maxapem® (Gist-Brocades); and α and β amylases such as Purafect Ox Am® (Genencor) and Termamyl®, Ban®, Fungamyl®, Duramyl®, and Natalase® (Novo); and mixtures thereof. Enzymes are preferably added herein as prills, granulates, or cogranulates at levels typically in the range from about 0.0001% to about 2% pure enzyme by weight of composition.

Bleaching Agent

Bleaching agents suitable herein include chlorine and oxygen bleaches, especially inorganic perhydrate salts such as sodium perborate mono- and tetrahydrates and sodium percarbonate optionally coated to provide controlled rate of release (see, for example, GB-A-1466799 on sulfate/carbonate coatings), preformed organic peroxyacids and mixtures thereof with organic peroxyacid bleach precursors and/or transition metal-containing bleach catalysts (especially manganese or cobalt). Inorganic perhydrate salts are typically incorporated at levels in the range from about 1% to about 40% by weight, preferably from about 2% to about 30% by weight and more preferably from abut 5% to about 25% by weight of composition. Peroxyacid bleach precursors preferred for use herein include precursors of perbenzoic acid and substituted perbenzoic acid; cationic peroxyacid precursors; peracetic acid precursors such as TAED, sodium acetoxybenzene sulfonate and pentaacetylglucose; pernonanoic acid precursors such as sodium 3,5,5-trimethylhexanoyloxybenzene sulfonate (iso-NOBS) and sodium nonanoyloxybenzene sulfonate (NOBS); amide substituted alkyl peroxyacid precursors (EP-A-0170386); and benzoxazin peroxyacid precursors (EP-A-0332294 and EP-A-0482807). Bleach precursors are typically incorporated at levels in the range from about 0.5% to about 25%, preferably from about 1% to about 10% by weight of composition while the preformed organic peroxyacids themselves are typically incorporated at levels in the range from 0.5% to 25% by weight, more preferably from 1% to 10% by weight of composition. Bleach catalysts preferred for use herein include the manganese triazacyclononane and related complexes (U.S. Pat. Nos. 4,246,612, 5,227,084); Co, Cu, Mn and Fe bispyridylamine and related complexes (U.S. Pat. No. 5,114,611); and pentamine acetate cobalt(III) and related complexes (U.S. Pat. No. 4,810,410).

Low Cloud Point Non-Ionic Surfactants and Suds Suppressers

The suds suppressers suitable for use herein include non-ionic surfactants having a low cloud point. "Cloud point", as used herein, is a well known property of nonionic surfactants which is the result of the surfactant becoming less soluble with increasing temperature, the temperature at which the appearance of a second phase is observable is referred to as the "cloud point" (See Kirk Othmer, pp. 360-362). As used herein, a "low cloud point" nonionic surfactant is defined as a nonionic surfactant system ingredient having a cloud point of less than 30° C., preferably less than about 20° C., and even more preferably less than about 10° C., and most preferably less than about 7.5° C. Typical low cloud point nonionic surfactants include nonionic alkoxylated surfactants, especially ethoxylates derived from primary alcohol, and polyoxypropylene/polyoxyethylene/polyoxypropylene (PO/EO/PO) reverse block polymers. Also, such low cloud point nonionic surfactants include, for example, ethoxylated-propoxylated alcohol (e.g., Olin Corporation's Poly-Tergent® SLF18) and epoxy-capped poly(oxyalkylated) alcohols (e.g., Olin Corporation's Poly-Tergent® SLF18B series of nonionics, as described, for example, in U.S. Pat. No. 5,576,281).

Preferred low cloud point surfactants are the ether-capped poly(oxyalkylated) suds suppresser having the formula:

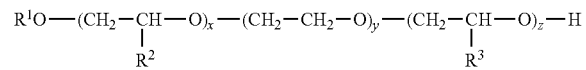

wherein $R^1$ is a linear, alkyl hydrocarbon having an average of from about 7 to about 12 carbon atoms, $R^2$ is a linear, alkyl hydrocarbon of about 1 to about 4 carbon atoms, $R^3$ is a linear, alkyl hydrocarbon of about 1 to about 4 carbon atoms, x is an integer of about 1 to about 6, y is an integer of about 4 to about 15, and z is an integer of about 4 to about 25.

Other low cloud point nonionic surfactants are the ether-capped poly(oxyalkylated) having the formula:

wherein, $R_I$ is selected from the group consisting of linear or branched, saturated or unsaturated, substituted or unsubstituted, aliphatic or aromatic hydrocarbon radicals having from about 7 to about 12 carbon atoms; $R_{II}$ may be the same or different, and is independently selected from the group consisting of branched or linear $C_2$ to $C_7$ alkylene in any given molecule; n is a number from 1 to about 30; and $R_{III}$ is selected from the group consisting of:

(i) a 4 to 8 membered substituted, or unsubstituted heterocyclic ring containing from 1 to 3 hetero atoms; and (ii) linear or branched, saturated or unsaturated, substituted or unsubstituted, cyclic or acyclic, aliphatic or aromatic hydrocarbon radicals having from about 1 to about 30 carbon atoms;

(b) provided that when $R^2$ is (ii) then either: (A) at least one of $R^1$ is other than $C_2$ to $C_3$ alkylene; or (B) $R^2$ has from 6 to 30 carbon atoms, and with the further proviso that when $R^2$ has from 8 to 18 carbon atoms, R is other than $C_1$ to $C_5$ alkyl.

Other suitable components herein include organic polymers having dispersant, anti-redeposition, soil release or other detergency properties invention in levels of from about 0.1% to about 30%, preferably from about 0.5% to about 15%, most preferably from about 1% to about 10% by weight of composition. Preferred anti-redeposition polymers herein include acrylic acid containing polymers such as Sokalan PA30, PA20, PA15, PA10 and Sokalan CP10 (BASF GmbH), Acusol 45N, 480N, 460N (Rohm and Haas), acrylic acid/maleic acid copolymers such as Sokalan CP5 and acrylic/methacrylic copolymers. Preferred soil release polymers herein include alkyl and hydroxyalkyl celluloses (U.S. Pat. No. 4,000,093), polyoxyethylenes, polyoxypropylenes and copolymers thereof, and nonionic and anionic polymers based on terephthalate esters of ethylene glycol, propylene glycol and mixtures thereof.

Heavy metal sequestrants and crystal growth inhibitors are suitable for use herein in levels generally from about 0.005% to about 20%, preferably from about 0.1% to about 10%, more preferably from about 0.25% to about 7.5% and most preferably from about 0.5% to about 5% by weight of composition, for example diethylenetriamine penta (methylene phosphonate), ethylenediamine tetra(methylene phosphonate) hexamethylenediamine tetra(methylene phosphonate), ethylene diphosphonate, hydroxy-ethylene-1,1-diphosphonate, nitrilotriacetate, ethylenediaminotetracetate, ethylene-diamine-N,N'-disuccinate in their salt and free acid forms.

The compositions herein can contain a corrosion inhibitor such as organic silver coating agents in levels of from about 0.05% to about 10%, preferably from about 0.1% to about 5% by weight of composition (especially paraffins such as Winog 70 sold by Wintershall, Salzbergen, Germany), nitrogen-containing corrosion inhibitor compounds (for example benzotriazole and benzimadazole—see GB-A-1137741) and Mn(II) compounds, particularly Mn(II) salts of organic ligands in levels of from about 0.005% to about 5%, preferably from about 0.01% to about 1%, more preferably from about 0.02% to about 0.4% by weight of the composition.

Other suitable components herein include colorants, water-soluble bismuth compounds such as bismuth acetate and bismuth citrate at levels of from about 0.01% to about 5%, enzyme stabilizers such as calcium ion, boric acid, propylene glycol and chlorine bleach scavengers at levels of from about 0.01% to about 6%, lime soap dispersants (see WO-A-93/08877), suds suppressors (see WO-93/08876 and EP-A-0705324), polymeric dye transfer inhibiting agents, optical brighteners, perfumes, fillers and clay.

Liquid detergent compositions can contain low quantities of low molecular weight primary or secondary alcohols such as methanol, ethanol, propanol and isopropanol can be used in the liquid detergent of the present invention. Other suitable carrier solvents used in low quantities includes glycerol, propylene glycol, ethylene glycol, 1,2-propanediol, sorbitol and mixtures thereof.

EXAMPLES

Abbreviations Used in Examples

In the examples, the abbreviated component identifications have the following meanings:

| | |
|---|---|
| Carbonate | Anhydrous sodium carbonate |
| STPP (anhydrous) | Sodium tripolyphosphate anhydrous |
| STPP (hydrated) | Sodium tripolyphosphate hydrated to approximately 8% |
| Silicate | Amorphous Sodium Silicate ($SiO_2:Na_2O$ = from 2:1 to 4:1) |
| HEDP | Ethane 1-hydroxy-1,1-diphosphonic acid |
| Perborate | Sodium perborate monohydrate |
| Percarbonate | Sodium percarbonate of the nominal formula $2Na_2CO_3 \cdot 3H_2O_2$ |
| Termamyl | α-amylase available from Novo Nordisk A/S |
| Savinase | protease available from Novo Nordisk A/S |
| FN3 | protease available from Genencor |
| SLF18 | low foaming surfactant available from Olin Corporation |
| ACNI | alkyl capped non-ionic surfactant of formula $C_{9/11}H_{19/23}EO_8$-cyclohexyl acetal |
| $C_{14}AO$ | tetradecyl dimethyl amine oxide |
| $C_{16}AO$ | hexadecyl dimethyl amine oxide |
| Duramyl | α-amylase available from Novo Nordisk A/S |
| DPG | dipropylene glycol |

In the following examples all levels are quoted as parts by weight.

Examples 1 to 4

The compositions of examples 1 to 4 are made in the form of a two compartment PVA pouch. The dual compartment pouch is made from a Monosol M8630 film as supplied by Chris-Craft Industrial Products. The pouches made by pre-sealing the liquid composition using the technique described hereinabove. The particulate composition and the anhydrous composition are placed in two different horizontal layered compartments, the anhydrous composition being placed above the particulate composition. The exemplified pouches show a good stability of the particulate automatic dishwashing product.

| | Example | | | |
|---|---|---|---|---|
| | 1 | 2 | 3 | 4 |
| Particulate composition | | | | |
| $C_{14}AO$ | 5.55 | 5.55 | | |
| $C_{16}AO$ | | | 5.55 | 5.55 |
| ACNI | 5.55 | 5.55 | | |
| SLF18 | | | 5.55 | 5.55 |
| STPP (anhydrous) | 21.0 | 21.0 | 21.0 | 21.0 |
| STPP (hydrated) | 31.5 | 31.5 | 31.5 | 31.5 |
| HEDP | 1.0 | 1.0 | 1.0 | 1.0 |
| Savinase | 0.7 | 0.7 | 0.7 | 0.7 |
| Termamyl | 0.7 | 0.7 | 0.7 | 0.7 |
| Perborate | | 13.55 | | 13.55 |
| Percarbonate | 13.55 | | 13.55 | |
| Carbonate | 15.0 | 10.0 | 15.0 | 15.0 |
| Silicate | 5.0 | 10.0 | 5.0 | 5.0 |
| Perfume | 0.5 | 0.5 | 0.5 | 0.5 |

| | Example | | | |
|---|---|---|---|---|
| | 1 | 2 | 3 | 4 |
| Anhydrous composition | | | | |
| DPG | 99.5 | 95.0 | 95.0 | 99.5 |
| FN3 Liquid | | 2.60 | 2.4 | |
| Duramyl Liquid | | 2.0 | 2.4 | |
| Dye | 0.5 | 0.4 | 0.2 | 0.5 |

Examples 5 to 8

The particulate compositions of examples 1 to 4 are formed into tablets. The tablets are prepared as follows. The detergent composition is prepared by admixing the granular and liquid components and is then passed into the die of a conventional rotary press. The press includes a punch suitably shaped for forming a mould in the upper surface of the tablet. The cross-section of the die is approximately 30×38 mm. The composition is then subjected to a compression force of 940 kg/cm², the punch is elevated, and a tablet comprising the mould is ejected from the tablet press.

Separately, PVA pouches are formed and filled with the anhydrous auxiliary compositions of examples 1 to 4.

The multi-compartment pouches are made by placing PVA film into a tray having a series of tablet-shaped depressions. The tray is filled with tablets, the tablets being positioned into the tray such that the tablet moulds are facing upwards. A layer of pouches comprising the anhydrous composition is placed with the pouches over and adjacent the moulds of the tablets and is used to close, by solvent sealing, the layer of open pouches comprising the tablets.

Monosol M8630 film as supplied by Chris-Craft Industrial Products was used to make the pouches.

The exemplified pouches show a good stability of the particulate automatic dishwashing product.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference. A citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A process of making a multi-compartment pouch comprising the steps of: pre-sealing a compartment comprising a pouch material, the compartment containing an anhydrous composition to form a pre-sealed compartment; fitting a first piece of the pouch material into a mould; pouring a particulate dishwashing product into the mould; placing the pre-sealed compartment over the mould; sealing the pre-sealed compartment and said first piece of pouch material together to form the multi-compartment pouch.

* * * * *